UNITED STATES PATENT OFFICE.

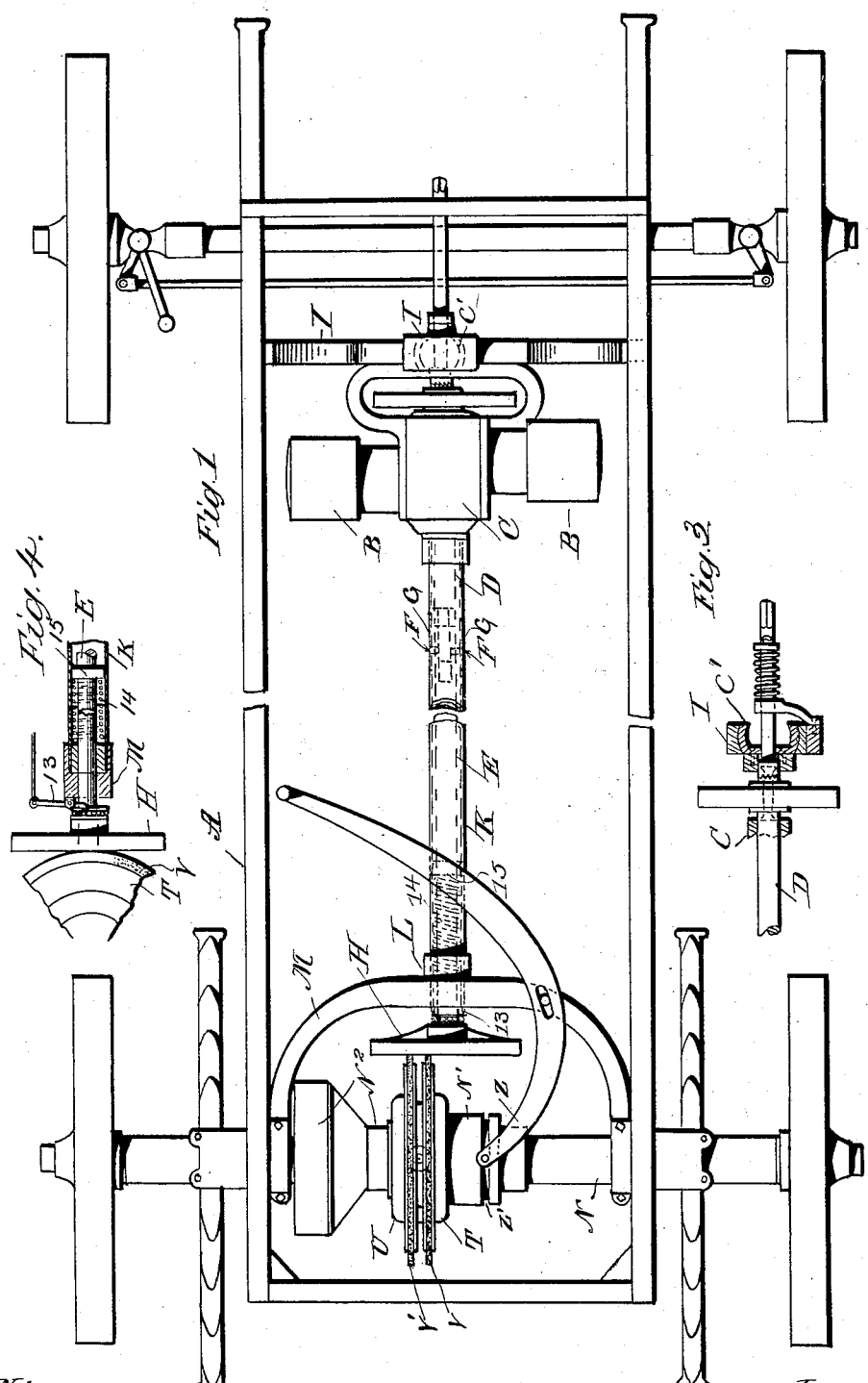

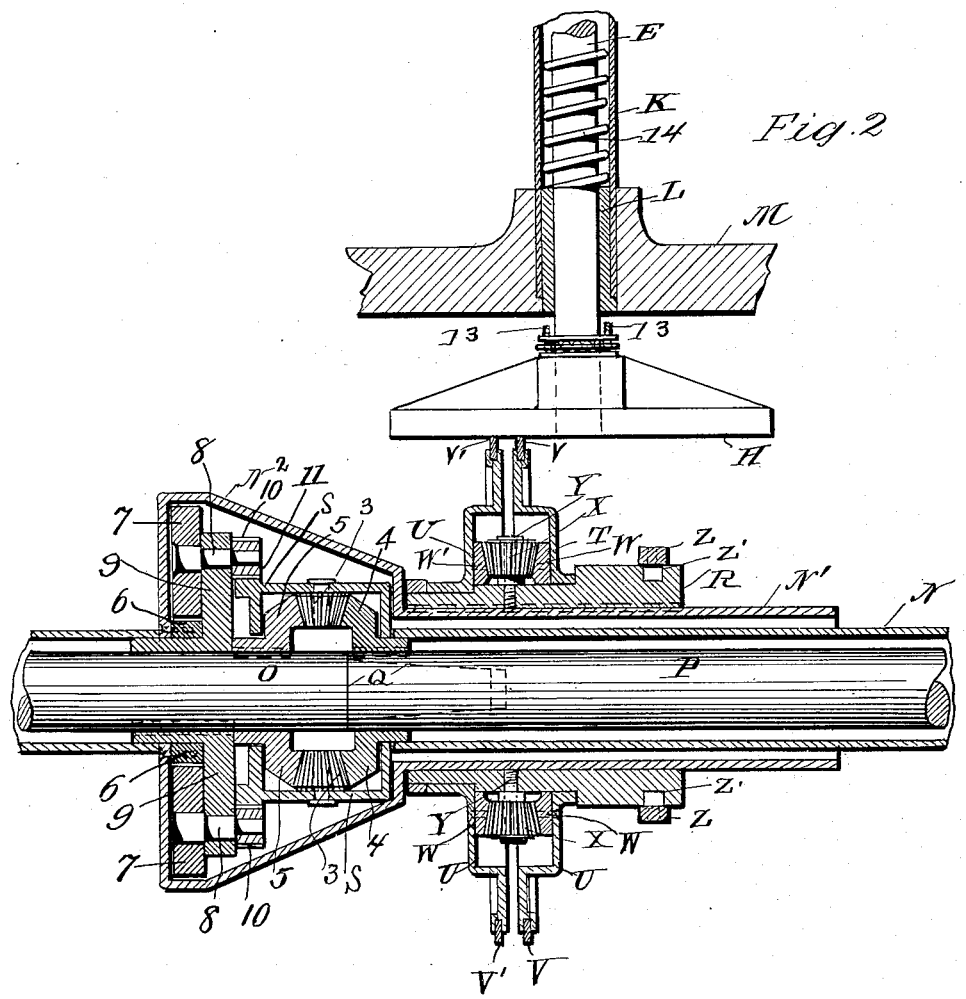

JAMES C. NOBLE, OF CLEVELAND, OHIO.

RUNNING-GEAR CONSTRUCTION AND TRANSMISSION DEVICE.

1,159,703. Specification of Letters Patent. Patented Nov. 9, 1915.

Application filed February 3, 1911, Serial No. 606,350. Renewed April 5, 1915. Serial No. 19,334.

*To all whom it may concern:*

Be it known that I, JAMES C. NOBLE, a citizen of the United States, and resident of Cleveland, in the county of Cuyahoga and State of Ohio, have invented certain new and useful Improvements in Running-Gear Construction and Transmission Devices, of which I hereby declare the following to be a full, clear, and exact description, such as will enable others skilled in the art to which it appertains to make and use the same.

The general objects of the invention are to provide means for increasing the driving surface and thereby the power of traction of a friction disk operating upon a friction wheel, and adaptable to various uses, especially to increase the traction of the friction drive of a shaft driven automobile. Also to provide a longitudinal support or frame for the motor and shaft, which is capable of automatic vertical and lateral adjustment on its bearings and which will thereby always be maintained in strict alinement with the plane of the driven axle, under all variations of level between the frame and wheel axles.

The specific features of the invention include a friction drive for the rear axle, and means for increasing the bearing surface of the driven member or friction wheel and for also reducing to a minimum degree the slipping of any portion of the engaging surface of the wheel, such as ordinarily occurs in one of the parts owing to the difference in radial distance from the center of the driving member of portions of the driven member. To obtain this result, the friction wheel is separated into two separate portions or pair of wheels of equal diameter, the edges of which engage the face of the friction disk at different radial distances from the center thereof and hence will rotate at different rates of speed. The two portions of the wheel are operatively connected by compensating gear mechanism and the wheels are mounted upon and drive a sleeve or member operatively connected with the driven shaft or axle.

Other features of the invention relate to the means for adaptation of the device to operate the divided driving axle of an automobile, and in means for adjusting the positions of the double friction wheel upon the friction disk, for varying the speed of the wheel, and also means for releasing the wheels from engagement.

It includes also a shaft housing and engine housing or frame, pivotally secured at the front end of the machine, and a rear support therefor secured to the housing of the rear axle.

The invention further consists in the combination and arrangement of parts and construction of details as hereinafter described, shown in the accompanying drawings and specifically pointed out in the claims.

In the accompanying drawings Figure 1 is a plan view of the frame of an automobile showing the improved method of attachment of swinging shaft housing and engine frame, and the construction of the friction driving mechanism; Fig. 2 is a horizontal section through the divided rear axle and friction and compensating gearing; Fig. 3 is an end elevation of ball bearing for the engine frame; Fig. 4 is a detail elevation of the clutch which operates the main shaft.

In these views A A are the side members of the frame, B B the engine cylinders and C the engine frame.

D is the engine or crank shaft such as is operatively connected with the main longitudinally movable shaft E by means of pins F moving in slots G in one member, or by any convenient means. Upon the outer end of the shaft E is secured the friction or driving disk H.

The engine shaft and frame C are supported upon a bracket or cross bar I near the front of the frame by means of a pivot joint C' through which the shaft projects and the inner and outer shafts D and E are inclosed in a tubular housing K provided with an outer bearing L for the shaft E, in turn secured to the yoke or fork M which is rigidly attached to the sleeve or rigid housing N which incloses the rear axle.

The rear axle is shown divided into two portions O and P one of which telescopes or has a bearing in the other at Q. Exterior to the housing N and slidingly movable upon a sleeve or hollow shaft N' and rotatable therewith, is shown a rotatable sliding sleeve R or clutch member and upon the sleeve are loosely mounted the two friction wheels T and U provided with friction edges V, V', adapted to engage the friction disk H in the same radial line but at different distances from the center of the disk, thus doubling the engaging surface and also doubling the power of traction obtained thereby.

The friction wheels T and U are operatively connected together and to the sliding sleeve R by means of compensating gears. The gears W and W' being sleeved over the outer sleeve R and secured to their respective disks V and V' and the pinions X, X being pivoted on pins Y, Y which project from the outer sleeve R. In this construction the small pinions X, X are driven by the gears W and W' to rotate the sliding sleeve R and permit of variations in speed in the gears W and W', and disks T and U since the small pinions X, X will rotate on their axes to compensate for the difference in speed of the friction pinions.

A clutch arm Z engages a channel $z'$ in the sliding sleeve R so that the speed of the driven member can be controlled by varying the radial distance from the center of the driving member.

Other features of the devices shown comprise the ordinary divided axle and compensating gear therefor in which small pinions 3, 3 drive the bevel gears 4 and 5 which are secured to the respective portions O and P of the axle. The pinions 3, 3 are mounted in the rotatable case S. Intermediate speed gearing can be employed also if desired of any suitable type. As shown the speed gearing is inclosed in an enlarged portion $N^2$ of the sleeve N' and comprises a spur gear 6 secured upon the portion $N^2$. Spur gear 7, 7, mounted upon pins 8, 8 which rotate in the flange 9 secured upon the shaft O, pinions 10, 10 revolving with the pins 8, 8, the spur gear 11 upon the gear case 12, and the compensating gears W, W' and pinions X, X previously described. The driving disk H and shaft E can be forced into engagement with the friction edges V, V' by means of the clutch 13 and is normally held withdrawn from such contact by means of a spring 14 engaging a shoulder 15 on the shaft.

Having described the invention what I claim as new and desire to secure by Letters Patent is—

1. In driving mechanism for an automobile, the combination with the frame, of a cross bar connecting the side members of said frame, an engine and housing therefor, said housing provided with an extension having its support in said cross bar, an engine shaft and bearings therefor in said engine housing, a divided rear axle and housing sleeve, a fork on said sleeve, a shaft housing secured to said engine casing and to said fork, a shaft slidingly connected with the engine shaft and longitudinally movable in said shaft housing, a driving disk on the rear end of the sliding shaft, friction wheels adapted to engage said disk, and operatively connected with a sleeve over said housing sleeve for the rear axle, compensating gears operatively connecting said friction wheels and means for operatively connecting said sleeve and divided shaft extremities, a lever for operating said sleeve to vary the speed of the driven disks, and a clutch for operating the sliding shaft to move the driving disk in and out of engagement with the friction disks.

2. The combination with the frame of an automobile, of a rigid front cross bar, a divided rear axle, a rigid housing for the rear axle, an engine and frame, said frame pivoted for universal movement in said rigid cross bar, a yoke secured to said rigid rear axle housing, a tubular shaft housing connecting said engine frame and yoke, a divided engine shaft in said housing, means for connecting said shafts operatively together, said means permitting of free longitudinal movement of the outer shaft, a bearing for the outer shaft in said yoke, a friction gear on said outer shaft and friction mechanism operatively connected with said rear axle, a spring in said shaft housing and a shoulder on said outer shaft, engaged by said spring, said spring adapted to normally hold back said shaft and said friction gear thereon from contact with said friction mechanism.

3. In combination with the side members of an automobile frame a cross bar connecting the side members near the front of the frame, a rear axle, a rigid axle housing on which the side members are mounted near the rear of the frame, an engine frame secured in said cross bar, a yoke secured to said axle housing, a tubular shaft housing secured in said yoke at one end and in said engine frame at the other end, alined shafts in said shaft housing, one shaft having longitudinal movement relatively to the other, the inner member of said shaft having a bearing in said engine frame and the outer member having a bearing in said yoke, a driving member on the extremity of said outer shaft member, a driven member operatively connected with the rear axle, means for maintaining the said driven and driving members normally out of contact with each other, and clutch mechanism for operating the outer shaft member to bring said driving member into contact with said driven member.

4. The combination with the side bars and a rigid front bar of an automobile frame, of an engine housing, a front extension thereof having pivotal movement in said bar, an engine shaft, bearings in said engine frame therefor, a divided rear axle and housing, a yoke thereon, a tubular shaft housing connecting said engine frame and yoke, a sliding shaft member projecting through said yoke, and operatively connected with said engine shaft, a driving disk on said sliding shaft member, an exterior sleeve upon the axle housing, a clutch member slidingly mounted thereon, a pair of closely adjacent friction disks sleeved over said clutch member, a bevel gear on each disk, and intermediate bevel pinions pivoted on said clutch member, compensating gear connecting the extremities of said divided rear axle, and speed gearing connecting compensating gear and said outer sleeve.

5. The combination with an automobile frame, of a front bar therein, an engine housing having a central connection with said bar, an engine shaft, a shaft member slidingly connected with said engine shaft, a driving disk on the end of said sliding shaft, a divided rear axle and a housing therefor, a bracket on the rear axle housing, a shaft housing connecting the engine housing and said bracket, an external sleeve on the axle housing, a pair of closely arranged driven disks, a compensating device operatively connecting said pair of driven disks and said external sleeve, and compensating means for operatively connecting said sleeve with the respective ends of said divided shaft.

6. In drive mechanism for an automobile, a frame for the running gear, an engine and housing, a pivotal support therefor, on the said frame, a divided rear axle and housing therefor, a yoke on the axle housing, a shaft housing connecting the engine housing and yoke, an engine shaft, a drive shaft slidingly connected with the engine shaft, and having a bearing in said yoke means for operating the sliding shaft in a longitudinal direction, a friction disk at the outer end of the said drive shaft, a pair of friction wheels, a sliding sleeve operatively connected with the portions of the rear axle, on which sliding sleeve said pair of friction wheels is mounted, a compensating device operatively connecting said friction wheels and sliding sleeve and means for operating said sliding sleeve.

In testimony whereof, I hereunto set my hand this 21 day of January, 1911.

JAMES C. NOBLE.

In presence of—
  WM. M. MONROE,
  GEO. S. COLE.

Copies of this patent may be obtained for five cents each, by addressing the "Commissioner of Patents, Washington, D. C."